(12) United States Patent
Shimizu et al.

(10) Patent No.: US 7,526,353 B2
(45) Date of Patent: Apr. 28, 2009

(54) SEQUENCE DESIGN SUPPORT SYSTEM

(75) Inventors: Yuki Shimizu, Mito (JP); Takayasu Kasahara, Mito (JP); Takashi Kaminagayoshi, Kamakura (JP); Nobuyoshi Watano, Tokyo (JP); Sachio Imuta, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 0 days.

(21) Appl. No.: 11/944,022

(22) Filed: Nov. 21, 2007

(65) Prior Publication Data
US 2008/0119954 A1 May 22, 2008

(30) Foreign Application Priority Data
Nov. 22, 2006 (JP) ............................. 2006-315443

(51) Int. Cl.
G06F 19/00 (2006.01)
(52) U.S. Cl. .............................. 700/97; 700/23; 700/86; 703/1; 703/22
(58) Field of Classification Search ...................... 700/1, 700/19, 86, 97, 247, 250, 253; 703/1, 22
See application file for complete search history.

(56) References Cited

U.S. PATENT DOCUMENTS

| | | | | |
|---|---|---|---|---|
| 3,978,454 A | * | 8/1976 | Willard | 700/1 |
| 4,267,458 A | * | 5/1981 | Uram et al. | 290/40 R |
| 5,093,772 A | * | 3/1992 | Senda et al. | 700/19 |
| 6,640,145 B2 | * | 10/2003 | Hoffberg et al. | 700/83 |
| 7,433,743 B2 | * | 10/2008 | Pistikopoulos et al. | 700/52 |
| 2006/0155398 A1 | * | 7/2006 | Hoffberg et al. | 700/86 |
| 2006/0200253 A1 | * | 9/2006 | Hoffberg et al. | 700/19 |

FOREIGN PATENT DOCUMENTS

| | | |
|---|---|---|
| JP | 09-146617 | 6/1997 |
| JP | 2004-234424 | 8/2004 |
| JP | 2005-293042 | 10/2005 |
| JP | 2006-227824 | 8/2006 |
| JP | 2006-323511 | 11/2006 |

* cited by examiner

*Primary Examiner*—Albert DeCady
*Assistant Examiner*—Douglas S Lee
(74) *Attorney, Agent, or Firm*—Antonelli, Terry, Stout & Kraus, LLP.

(57) ABSTRACT

A sequence design support system is used to support a design of a sequence control program which controls a flow path condition of a fluid in an apparatus and piping system which is constructed connecting apparatus such as a valve with piping and comprises a valve pattern plan generation unit which generates a valve pattern plan which is plan data showing the flow path condition per time step of the fluid in the apparatus and piping system from apparatus and piping system plan data which is plan data showing the apparatus and piping system and time chart sheet which is obtained defining the condition of the apparatus in the apparatus and piping system per time step.

13 Claims, 15 Drawing Sheets

FIG. 3

| TAG | NAME | 1 | 2 | 3 | 4 | 5 | 6 | 7 | 8 | 9 | 10 |
|---|---|---|---|---|---|---|---|---|---|---|---|
| | NUMBER | | | | | | | | | | |
| | LARGE STEP NUMBER | | | | | | | | | | |
| | MEDIUM STEP NUMBER | | | | | | | | | | |
| | STEP NUMBER | | | | | | | | | | |
| | SMALL STEP | | | | | | | | | | |
| | START CONDITION | | | | | | | | | | |
| | TRANSFER CONDITION | | | | | | | | | | |
| | SYNCHRONIZATION CONDITION | | | | | | | | | | |
| | STOP TRANSFER DESTINATION | | | | | | | | | | |
| | EMERGENCY STOP TRANSFER DESTINATION | | | | | | | | | | |
| | ABNORMAL STOP TRANSFER DESTINATION | | | | | | | | | | |
| | NOTES | | | | | | | | | | |
| | RESERVE 1 | | | | | | | | | | |
| | RESERVE 2 | | | | | | | | | | |
| | VALVE A | | | OPEN | | | | | | | |
| | VALVE B | | | SHUT | | | | | | | |
| | VALVE C | | | OPEN | | | | | | | |
| | VALVE D | | | SHUT | | | | | | | |
| | VALVE E | | | OPEN | | | | | | | |
| | VALVE F | | | SHUT ▶ | | | | | | | |
| | PIPING TERMINAL H | | | ENTRANCE | | | | | | | |
| | TANK T | | | OPEN | ▶ | | | | | | |

41

D5-c

FILE NAME: TANK.dxf

FIGURE DATA:

D5-d

FILE NAME: LINEAR PIPING.dxf

FIGURE DATA:

FIG. 10

APPARATUS UNIT RECOGNITION INFORMATION

APPARATUS ID: 00002

APPARATUS KIND: VALVE

APPARATUS NAME: VALVE A

CONNECTED PIPING ID: 00001,00002

FIG. 11

PIPING UNIT RECOGNITION INFORMATION

PIPING ID: 0003

PIPING KIND: LINEAR PIPING

PIPING NAME: PIPING c

CONNECTED APPARATUS ID: 00002,00003

FIG. 12

PIPING GROUP UNIT RECOGNITION INFORMATION

PIPING GROUP ID: 00001

PIPING GROUP NAME: PIPING GROUP G

MEMBER PIPING ID: 00002

SEQUENCE DESIGN SUPPORT SYSTEM

BACKGROUND OF THE INVENTION

The present invention relates to the design of a sequence control program used for the control of an apparatus and piping system which is constructed connecting the apparatus such as a valve and a tank with piping, and in particular, to a sequence design support system which supports so that its sequence design can be done efficiently.

For example, in a manufacturing equipment which is equipped with an apparatus and piping system which is constructed connecting the apparatus (process apparatus) such as a valve and a tank with piping, such as a medicine manufacture equipment, the flow path condition which is a condition in which a fluid such as an ingredient and a product or a wash liquid flows in its apparatus and piping system is supposed to be automatically controlled by the sequence control program. Such control in the apparatus and piping system is conducted as control of an operation of the apparatus such as an open and shut operation in the valve. For this reason, in the sequence design as a design of the sequence control program, it is general that the design of the sequence control program is conducted with plan data which describes the flow path condition per time step of the fluid in the apparatus and piping system (hereafter this plan data will be called a valve pattern plan) as original data. For example, a conventional representative example of such a sequence design is disclosed in a patent document 1.

The "sequence control program input device" of the patent document 1 is provided with a process flow chart generation part, a per scene sequence operation generation part, and a sequence control program generation part, and generates a process flow chart which shows arrangement relationship of the apparatus and a physical distribution path successively arranging the apparatus and the piping which are the objects of the control on a display screen in the process flow chart generation part, successively defines sequence control operations for that process flow chart and generates the physical distribution and apparatus operations in each scene of the sequence control operations in the per scene sequence operation generation part, and generates the sequence control program from those sequence control operations (the valve pattern plan) in the sequence control program generation part.

SUMMARY OF THE INVENTION

The "sequence control program input device" of JP-A-9-146617 enhances the automation of the creation of the valve pattern plan (a sequence control operation) which is to be the original data of the sequence control program, and makes the sequence design to be conducted efficiently in its own way. However, in the "sequence control program input device" of JP-A-9-146617, it is necessary to create the process flow chart for the creation of the valve pattern plan, and, it is supposed to rely on the hand inputting of the many of the works in the creation of that process flow chart, therefore it places a heavy burden upon the user.

The present invention has been invented with the background of the above-mentioned circumstances, and the objects of the present invention is to enhance the automation rate of the creation of the valve pattern plan which is to be the original data of the sequence control program, and thereby to realize a sequence design support system which supports so that the sequence design can be conducted more efficiently.

In order to accomplish the above-mentioned objects, the present invention provides a sequence design support system which supports a sequence design as a design of a sequence control program which controls a flow path condition of a fluid in an apparatus and piping system which is constructed connecting apparatus such as a valve with piping, which comprises a valve pattern plan generation unit which generates a valve pattern plan which is plan data showing the flow path condition per time step of said fluid in said apparatus and piping system from apparatus and piping system plan data which is plan data showing said apparatus and piping system and a time chart sheet which is obtained defining the condition of said apparatus in said apparatus and piping system per time step.

In this way, by making the valve pattern plan to be generated from the apparatus and piping system plan data and the time chart sheet which are both electronic data, the automation rate of the creation of the valve pattern plan can be enhanced greatly, and thereby the sequence design can be conducted more efficiently.

In the above-mentioned preferred embodiment of the sequence design support system, said valve pattern plan generation unit is provided with a plan recognition processing part and a valve pattern plan generation processing part, and said plan recognition processing part individually recognizes the apparatus and the piping or piping group on said apparatus and piping system plan data and at the same time generates plan recognition data performing plan recognition processing which is processing which recognizes the connection relationship of the individually recognized apparatus and the like and the relationship of member piping of piping group and the like, and said valve pattern plan generation processing part generates said valve pattern plan using said plan recognition data.

In such an embodiment, the plan recognition data generated by the plan recognition processing part effectively functions for the correlation of the apparatus and piping system plan data and the time chart sheet, and thereby the automatic correlation of the apparatus and piping system plan data and the time chart sheet can be conducted more easily and the generation of the valve pattern plan can be conducted more efficiently.

Regarding the above-mentioned sequence design support system, it is preferable to provide said valve pattern plan generation unit with a figure information database which stores figure information which is information about a figure expression of said apparatus and the piping and the like on said apparatus and piping system plan data and provides the same to said plan recognition processing part, and to make said plan recognition processing at said plan recognition processing part to be conducted based on said figure information. Thereby the plan recognition processing by the plan recognition processing part can be conducted more efficiently.

Also, in the above-mentioned preferred embodiment of the sequence design support system, said valve pattern plan generation unit is further provided with a time chart generation processing part, and said time chart generation processing part is made to generate a time chart sheet form which is to be used for the generation of said time chart sheet from said plan recognition data. By allowing the time chart sheet form to be generated using the plan recognition data in this way, the generation of the time chart sheet can be conducted more efficiently.

Also, in the above-mentioned preferred embodiment of the sequence design support system, the generation of said valve pattern plan in said valve pattern plan generation processing part is supposed to be conducted including processing such as first searching a piping terminal of which condition is "entrance" based on said plan recognition data, then searching in order the piping connected to the piping terminal of the condition "entrance" and the apparatus connected to that piping, further determining the flow path condition of the fluid in said apparatus and piping system by determining the condition of the searched apparatus by said time chart sheet. Thereby the generation of the valve pattern plan by the valve pattern plan generation processing part can be conducted more efficiently.

Also, in the above-mentioned preferred embodiment of the sequence design support system, said valve pattern plan is supposed to be generated in a form of displaying the flow path condition of the fluid in said apparatus and piping system by the change of the display condition of said piping on said apparatus and piping system data.

Also, in the above-mentioned preferred embodiment of the sequence design support system, said valve pattern plan generation unit is supposed to be further provided with a plan recognition data editing processing part to conduct the editing of said plan recognition data. By allowing the editing of the plan recognition data to be conducted in this way, the precision of the plan recognition data can be improved and the sequence design support by the automatic generation of the valve pattern plan can be conducted more efficiently.

Also, in the above-mentioned preferred embodiment of the sequence design support system, said time chart sheet is supposed to be formed in a table form which has a line which arranges each apparatus on said apparatus and piping system plan data, a column which arranges said time step, and a definition section where said line and said column cross, and the condition of said apparatus is defined in said definition section. The time chart sheet in such a table form makes the condition definition of the apparatus to be conducted easier.

According to the present invention as described above, the automation rate of the creation of the valve pattern plan which is to be the original data of the sequence control program can be enhanced, and thereby the sequence design can be conducted more efficiently.

BRIEF DESCRIPTION OF THE DRAWINGS

FIG. 3 is a diagram showing an example of a time chart sheet.

FIG. 10 is a diagram showing an example of data structure of apparatus unit recognition information.

FIG. 11 is a diagram showing an example of data structure of piping unit recognition information.

FIG. 12 is a diagram showing an example of data structure of piping group unit recognition information.

DESCRIPTION OF THE EMBODIMENT

Figure 1:
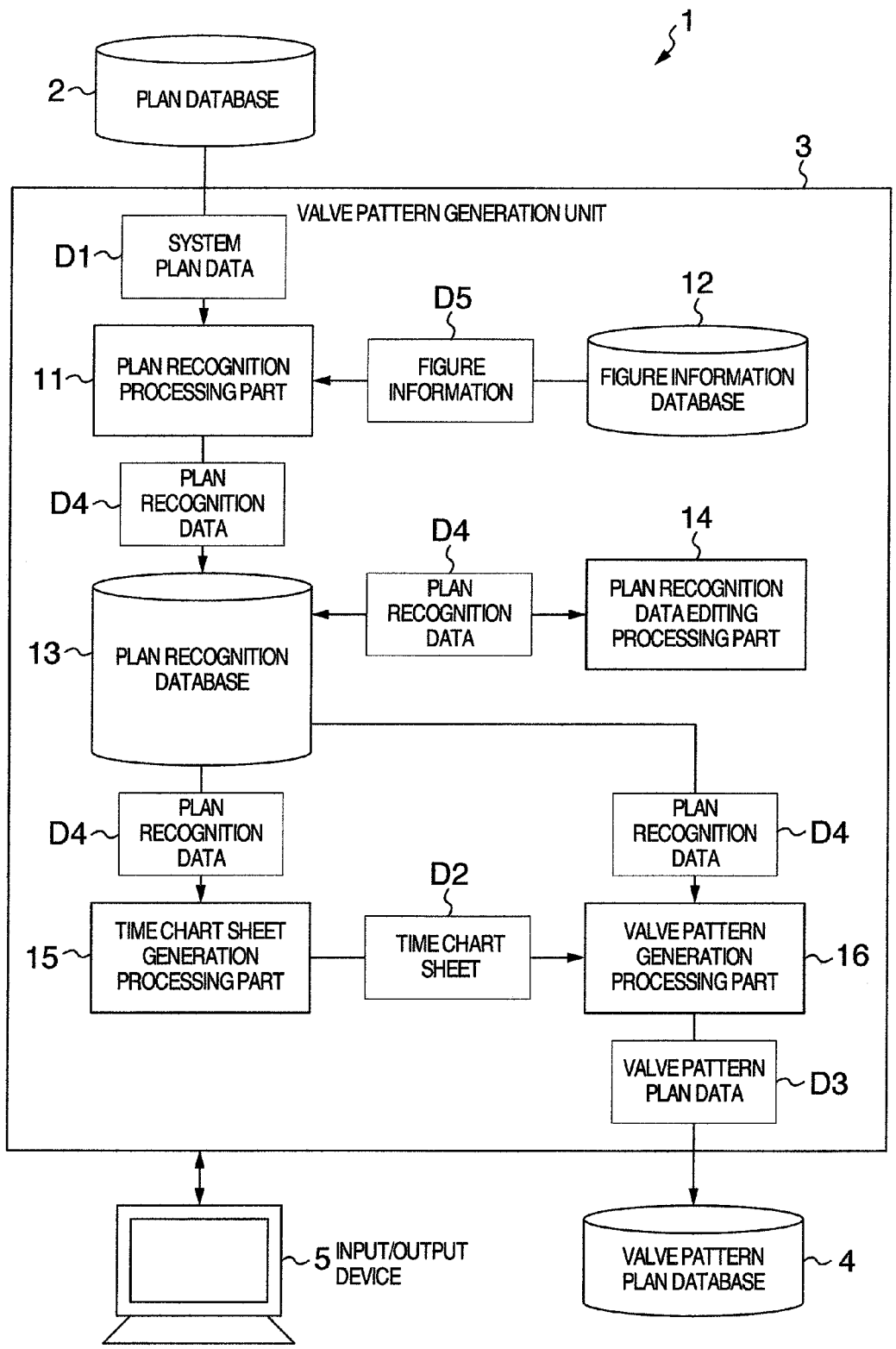
FIG. 1 is a diagram showing a configuration of a sequence design support system according to one embodiment.

An embodiment to implement the present invention will be explained below. FIG. 1 shows a configuration of a sequence design support system according to one embodiment. A sequence design support system 1 is supposed to generate a valve pattern plan (valve pattern plan data) which is plan data describing a flow path condition per time step of a fluid such as an ingredient and a product or a wash liquid and the like in the apparatus and piping system from apparatus and piping system plan data which is plan data showing an apparatus and piping system which is constructed connecting apparatus such as a valve and a tank and the like with piping (hereinafter it will be called system plan data) and a time chart sheet (time chart sheet data) which is data of sheet form (table form) which is obtained by that a user (a system user) defines a condition of the apparatus (operation condition, etc.) per time step. Here, the time step means a time step which has a certain time in which a condition that the flow path condition transfers from the present condition to the next condition is established as one step.

For this purpose, the sequence design support system 1 is provided with a plan database 2, a valve pattern plan generation unit 3, a valve pattern plan database 4, and an input/output device 5.

Figure 2:
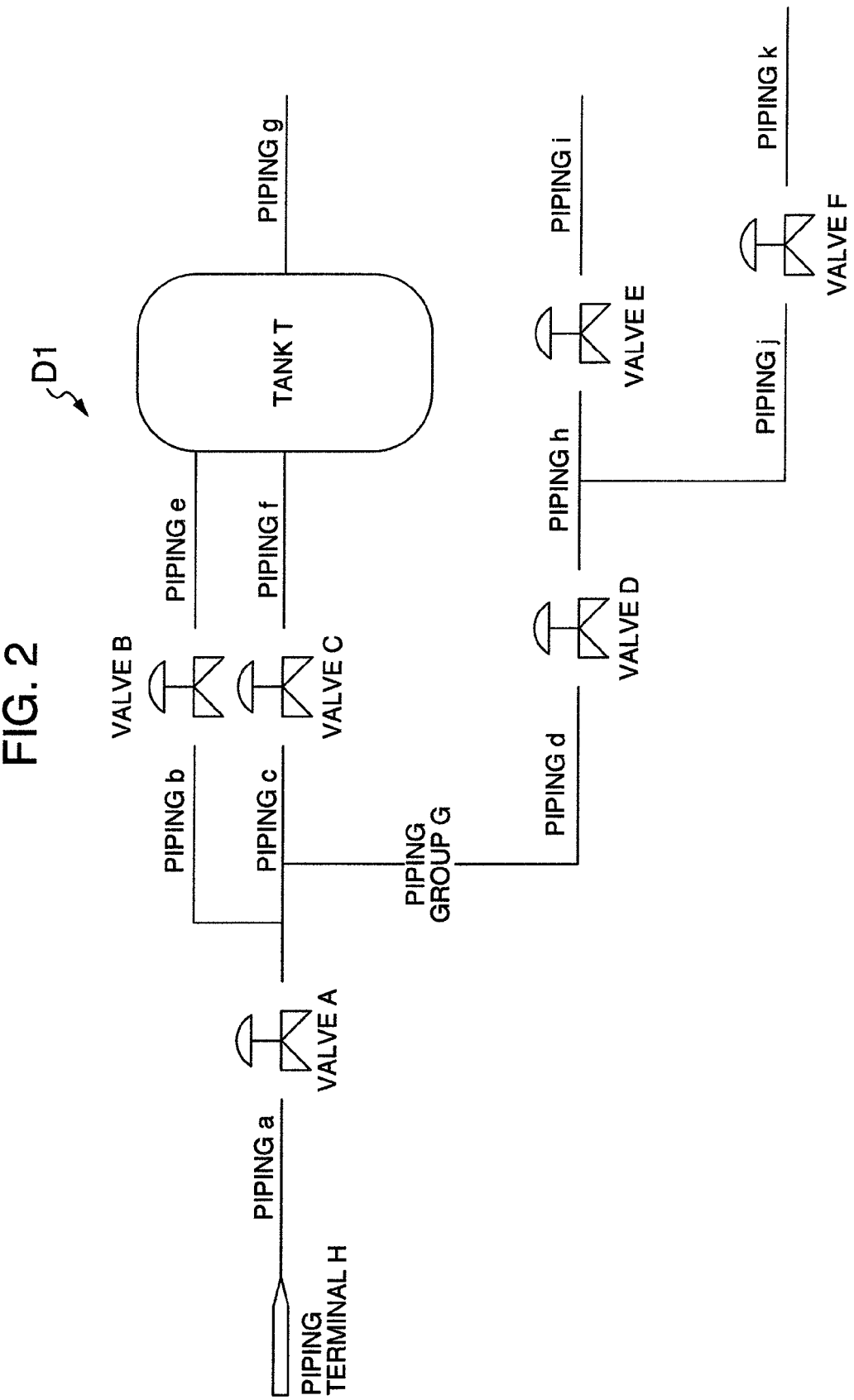
FIG. 2 is a diagram showing an example of system plan data.

The plan database 2 functions to store system plan data D1 of which example is shown in FIG. 2 and to provide the same to the valve pattern plan generation unit 3.

Figure 4:
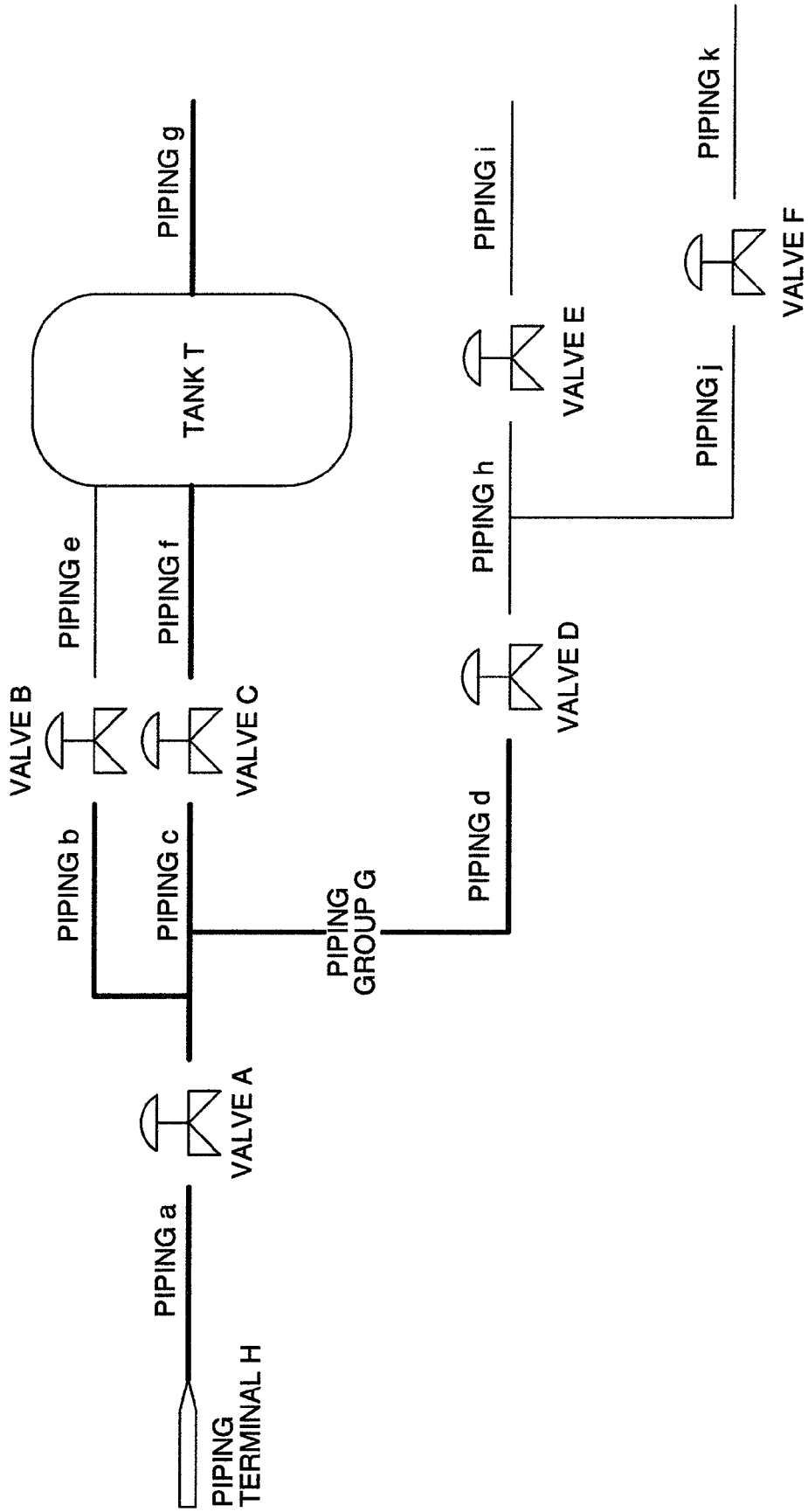
FIG. 4 is a diagram showing an example of a valve pattern plan.

The valve pattern plan generation unit 3 functions to automatically generate a valve pattern plan D3 (of which example is shown in FIG. 4) from the system plan data D1 which is fetched from the plan database 2 and a time chart sheet D2 (of which example is shown in FIG. 3) which is created as described later, and for this purpose it is provided with a plan recognition processing part 11, a figure information database 12, a plan recognition database 13, a plan recognition data editing processing part 14, a time chart generation processing part 15, and a valve pattern plan generation processing part 16.

The plan recognition processing part 11 automatically recognizes the system plan data D1 and generates plan recognition data D4. More specifically, the plan recognition processing part 11 conducts the plan recognition of the system plan data D1 according to the pattern matching method as described later using figure information D5 (of which examples are shown in FIGS. 6 to 9) stored in the figure information database 12. In the plan recognition, the apparatus and the piping or the piping group and the like on the system plan data D1 are individually recognized and at the same time the connection relationship of the individually recognized apparatus and the like and the relationship of member piping of the piping group are recognized. Then the plan recognition data D4 is generated as system plan data which is added plan recognition information, that is, as plan recognition information added system plan data, by embedding the plan recognition information obtained by this plan recognition in the system plan data D1.

The figure information database 12 functions to store the figure information D5 which is information about the figure expression on the system plan data D1 and to provide the same to the plan recognition processing part 11.

The plan recognition database 13 functions to store the plan recognition data D4 which the plan recognition processing part 11 generated and to provide the same to the plan recognition data editing processing part 14, the time chart generation processing part 15, and the valve pattern plan generation processing part 16.

The plan recognition data editing processing part 14 is used for that the user edits the plan recognition data D4 as the need arises.

The time chart generation processing part 15 is used for the generation of the time chart sheet D2. The generation of the time chart sheet D2 is conducted by that the user inputs the definition of the condition of the apparatus per time step in the time chart sheet form which is automatically generated based on the plan recognition data D4 fetched from the plan recognition database 13.

The valve pattern plan generation processing part 16 automatically generates the valve pattern plan D3 using the time chart sheet D2 and the plan recognition data D4.

The valve pattern plan database 4 is used to store the valve pattern plan D3 which the valve pattern plan generation unit 3 generated.

The input/output device 5 is used for that the user inputs processing instructions and data necessary for the processing and displays an operation screen regarding the processing and a processing result, and it includes a keyboard and a mouse for the inputting of the processing instructions and data, and a display for the display of the operation screen and the processing result, etc.

Figure 5:
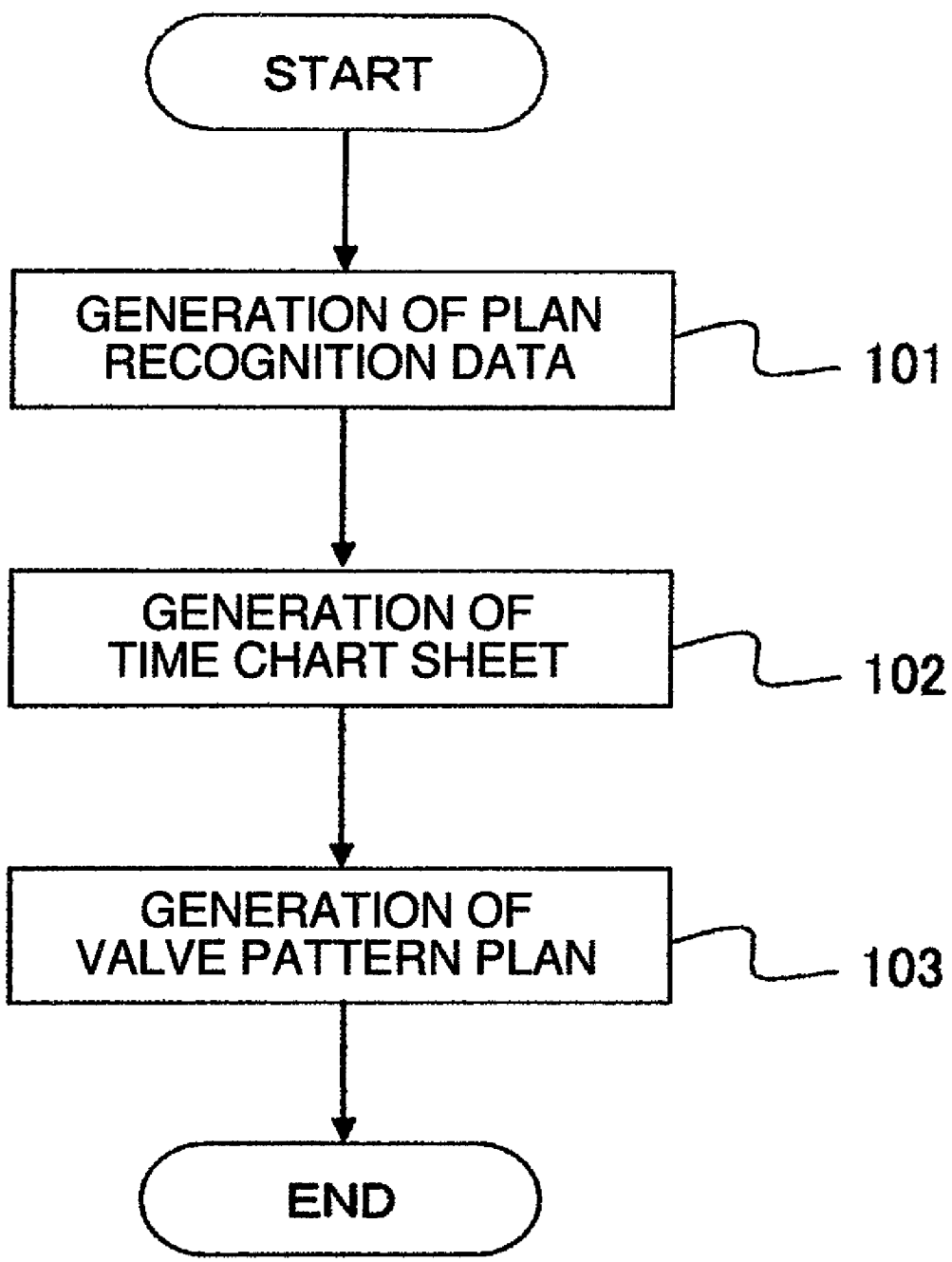
FIG. 5 is a diagram showing a general flow of process in the sequence design support system of FIG. 1.

The above is the basic configuration of the sequence design support system 1. Below, it will be explained about the processing conducted in this sequence design support system 1. The processing in the sequence design support system 1 includes each processing of step 101 to step 103 as its flow shown in FIG. 5.

The step 101 is the plan recognition data generation processing in which the plan recognition processing part 11 generates the plan recognition data D4, the step 102 is the time chart sheet generation processing in which the time chart generation processing part 15 generates the time chart sheet D2, and the step 103 is the valve pattern plan generation processing in which the valve pattern plan generation processing part 16 generates the valve pattern plan D3 using the time chart sheet D2 and the plan recognition data D4. Below, each processing of these will be explained in order in detail.

At the plan recognition data generation processing of the step 101, the plan recognition data D4 is generated by the plan recognition of the system plan data D1 using the figure information D5 as described above. In explaining the detail of these processing, first, it will be explained about the figure information D5 and the plan recognition data D4.

Figure 6:
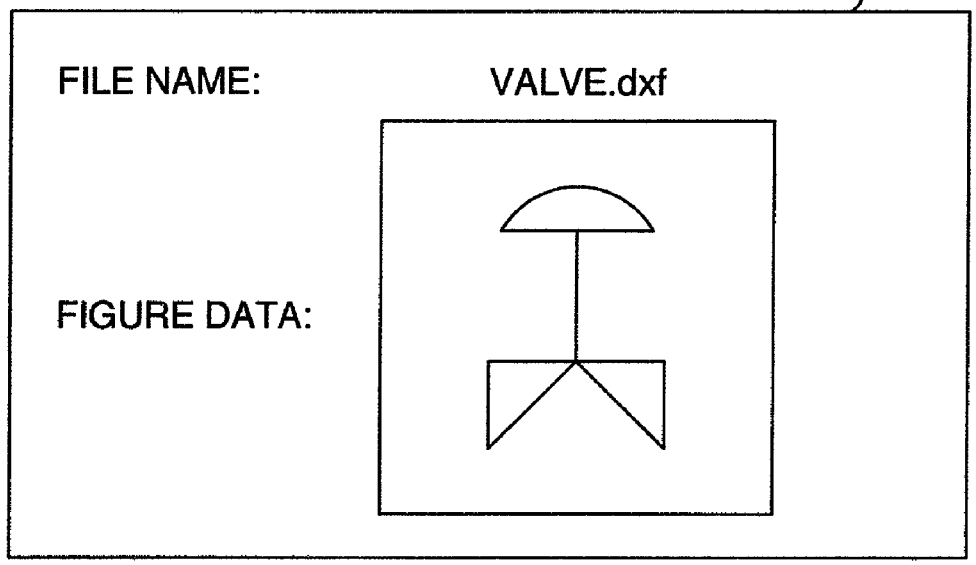
FIG. 6 is a diagram showing an example of figure information about a valve.
Figure 7:
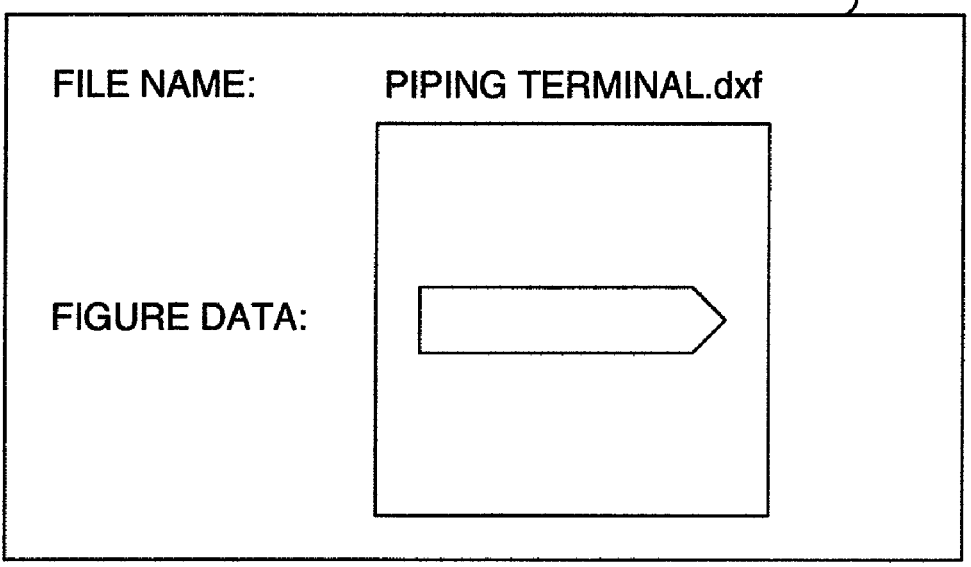
FIG. 7 is a diagram showing an example of the figure information about a piping terminal.
Figure 8:
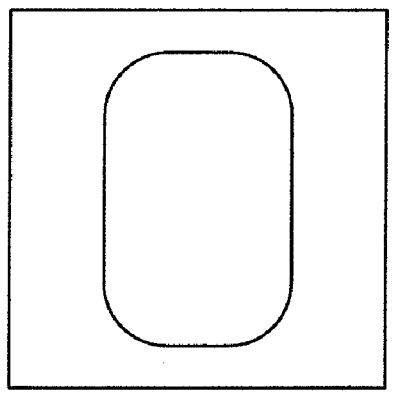
FIG. 8 is a diagram showing an example of the figure information about a tank.
Figure 9:
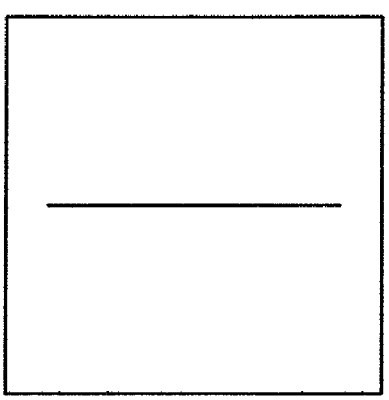
FIG. 9 is a diagram showing an example of the figure information about piping.

Examples of the figure information D5 are shown in FIGS. 6 to 9. Figure information D5-$a$ of FIG. 6 is an example about a valve which is one of the apparatus, figure information D5-$b$ of FIG. 7 is an example of a piping terminal which is one of the apparatus, figure information D5-$c$ of FIG. 8 is an example of a tank which is one of the apparatus, and figure information D5-$d$ of FIG. 9 is an example of a linear piping which is one of the piping. As seen in these examples, the figure information D5 is created as a file with each kind of each kind of apparatus and each kind of piping which has a possibility of appearing in the apparatus and piping system plan as unit and it includes each item of "file name" and "figure data". In the "file name", a name of the kind of each kind of apparatus such as a valve, a tank, a piping terminal, and the like, and a name of the kind of each king of piping such as linear piping, double piping, vent piping, and the like is described. On the other hand, in the "figure data", a figure pattern of the apparatus and the piping on the apparatus and piping system plan is described. Here, the system plan data D1 of the example of FIG. 2 is supposed to include only the valves, the tanks, and the piping terminals as an apparatus, but the apparatus may include pumps and the like other than these.

The plan recognition data D4 is generated as plan recognition information added system plan data which can be obtained by embedding the plan recognition information generated at the plan recognition of the system plan data D1 in the system plan data D1 as described above. In that plan recognition information, there are three kinds of information such as apparatus recognition information, piping recognition information, and piping group recognition information. The apparatus recognition information is a group of apparatus unit recognition information created individually with each apparatus as unit about all of the apparatus included in the system plan data D1, the piping recognition information is a group of piping unit recognition information created individually about all of the piping included in the system plan data D1, and the piping group recognition information is a group of piping group unit recognition information created individually about all of the piping groups included in the system plan data D1.

As described above, the plan recognition data D4 is data in which the plan recognition information is added to the system plan data D1, and its plan recognition information includes the apparatus recognition information which is a group of the apparatus unit recognition information, the piping recognition information which is a group of the piping unit recognition information, and the piping group recognition information which is a group of the piping group unit recognition information.

Examples of the unit recognition information of each of the apparatus, the piping, and the piping group are shown in FIGS. 10 to 12. FIG. 10 shows the apparatus unit recognition information about a valve A in the system plan data D1 of FIG. 2. The apparatus unit recognition information is configured including each information item of "apparatus ID", "apparatus kind", "apparatus name", and "connected piping ID". In the "apparatus ID", an ID as identification information to individually identify each apparatus on the system plan data D1 is written. The ID which is to be written in the "apparatus ID" is set by the plan recognition processing part 11 so that it is different at all of the apparatus on the system plan data D1. In the "apparatus kind", the kind of the apparatus such as a valve, a piping terminal, a tank, etc. is written. In the "apparatus name", an individual apparatus name (in the example of FIG. 2, "valve A", "tank T", "piping terminal H", etc.) which is given to said apparatus on the system plan data D1 is written. In the "connected piping ID", identification information of the piping connected to said apparatus, more specifically an ID which is given to the piping as described later, is written.

FIG. 11 shows the piping unit recognition information about piping c in the system plan data D1 of FIG. 2. The piping unit recognition information is configured including each information item of "piping ID", "piping kind", "piping name", and "connected apparatus ID". In the "piping ID", an ID as identification information to individually identify each piping on the system plan data D1 is written. The ID which is to be written in the "piping ID" is set by the plan recognition processing part 11 so that it is different at all of the piping on the system plan data D1. In the "piping kind", the kind of the piping such as linear piping, double piping, vent piping, etc. is written. In the "piping name", an individual piping name (in the example of FIG. 2, "piping a", "piping b", etc.) which is given to said piping on the system plan data D1 is written. In the "connected apparatus ID", an apparatus ID which is given as described above of the apparatus to which said piping is connected is written.

FIG. 12 shows the piping group unit recognition information about a piping group G in the system plan data D1 of FIG. 2. The piping group unit recognition information is configured including each information item of "piping group ID", "piping group name", and "member piping ID". In the "piping group ID", an ID as identification information to individually identify each piping group on the system plan data D1 is written. The ID which is to be written in the "piping group ID" is set by the plan recognition processing part 11 so that it is different at all of the piping groups on the system plan data D1. Here, the piping group means the piping which is surrounded by the apparatus and is grouped. In the case of the example of FIG. 2, a group of piping "piping b, piping c, piping d" which is surrounded by valve A, valve B, valve C, and valve D becomes one piping group. In the "piping group name", an individual piping group name which is given to said piping group on the system plan data D1 is written. In the "member piping ID", an ID of the piping which is a member of said piping group is written.

The plan recognition information such as the above is embedded in the system plan data D1, and thereby the plan recognition data D4 is generated as plan recognition information added system plan data. The embedding of the plan recognition information to the system plan data D1 is conducted by writing the plan recognition information in an attribute information section which the system plan data D1 has. More specifically, as the attribute information section in which the attribute information per object can be recorded is individually added to the object (individual apparatus and piping) on the system plan data D1, the embedding of the plan recognition information to the system plan data D1 is conducted by writing the apparatus unit recognition information, the piping unit recognition information, and the piping group unit recognition information corresponding to the object in this attribute information section per object.

Figure 13:
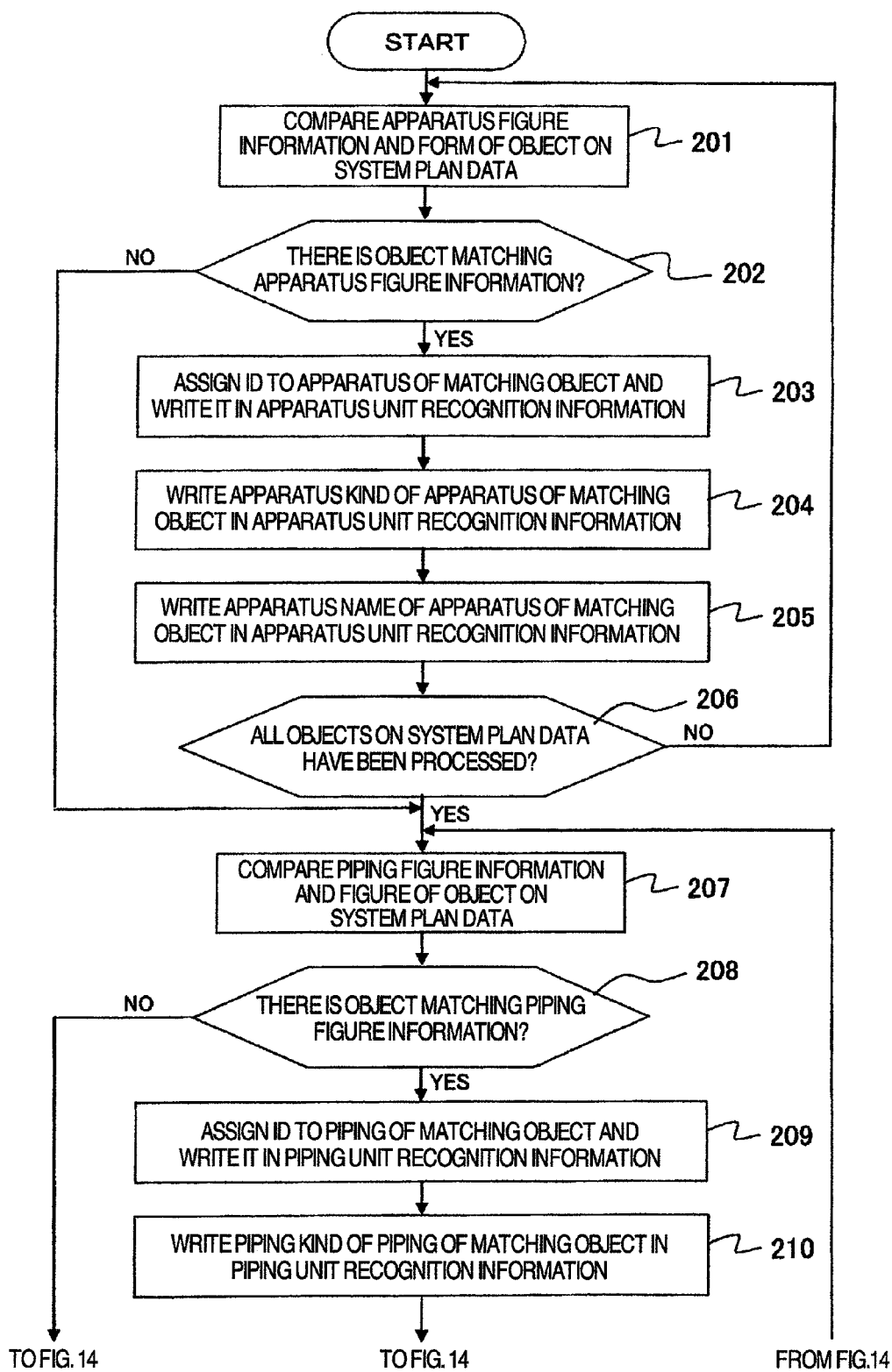
FIG. 13 is a diagram showing the first half of a flow of plan recognition data generation processing.
Figure 14:
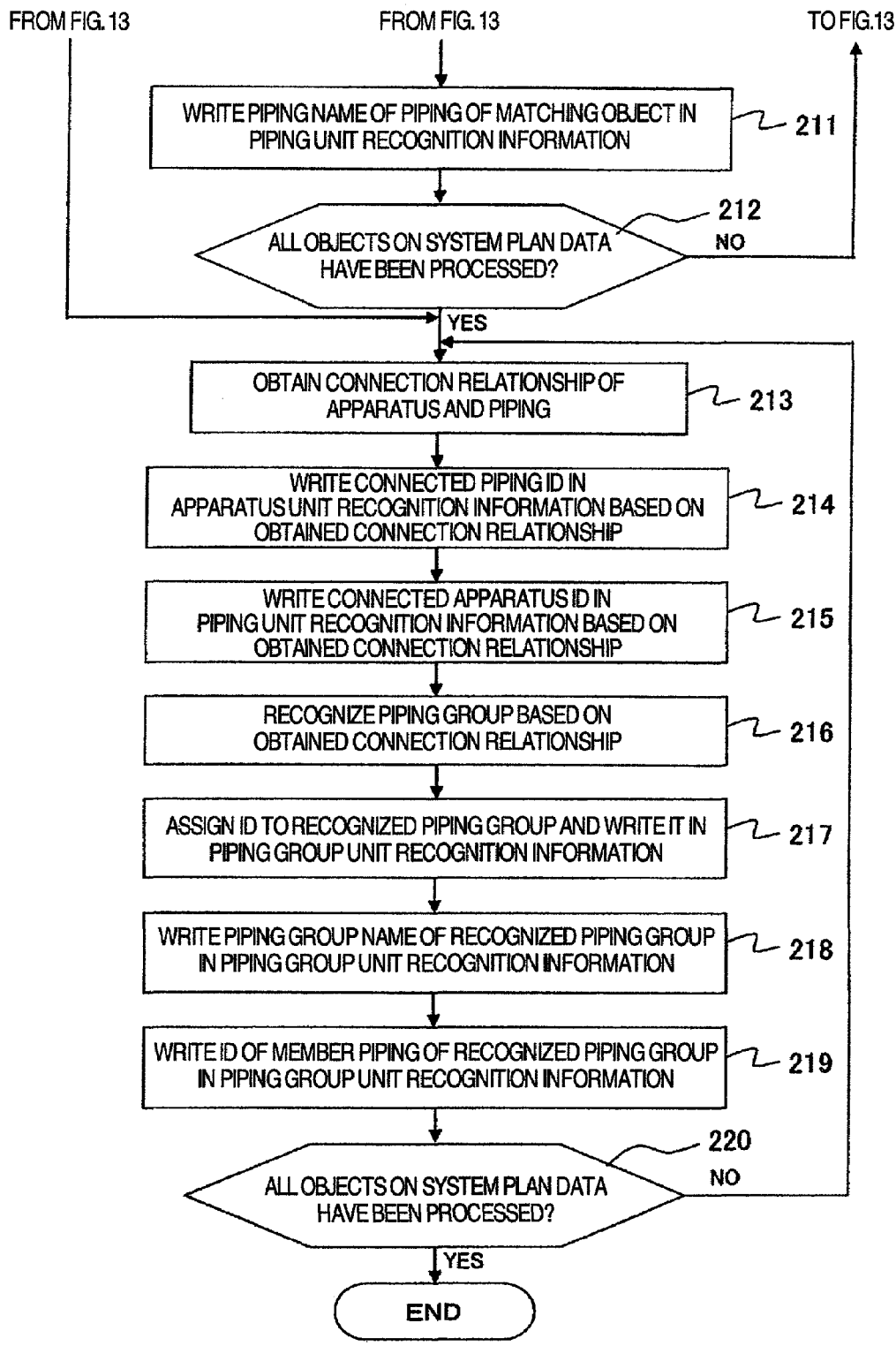
FIG. 14 is a diagram showing the latter half of the flow of the plan recognition data generation processing.

Next, the plan recognition data generation processing at the step 101 will be explained. The plan recognition data generation processing includes each processing of step 201 to step 220 as its flow shown in FIGS. 13 and 14.

Figure 15:
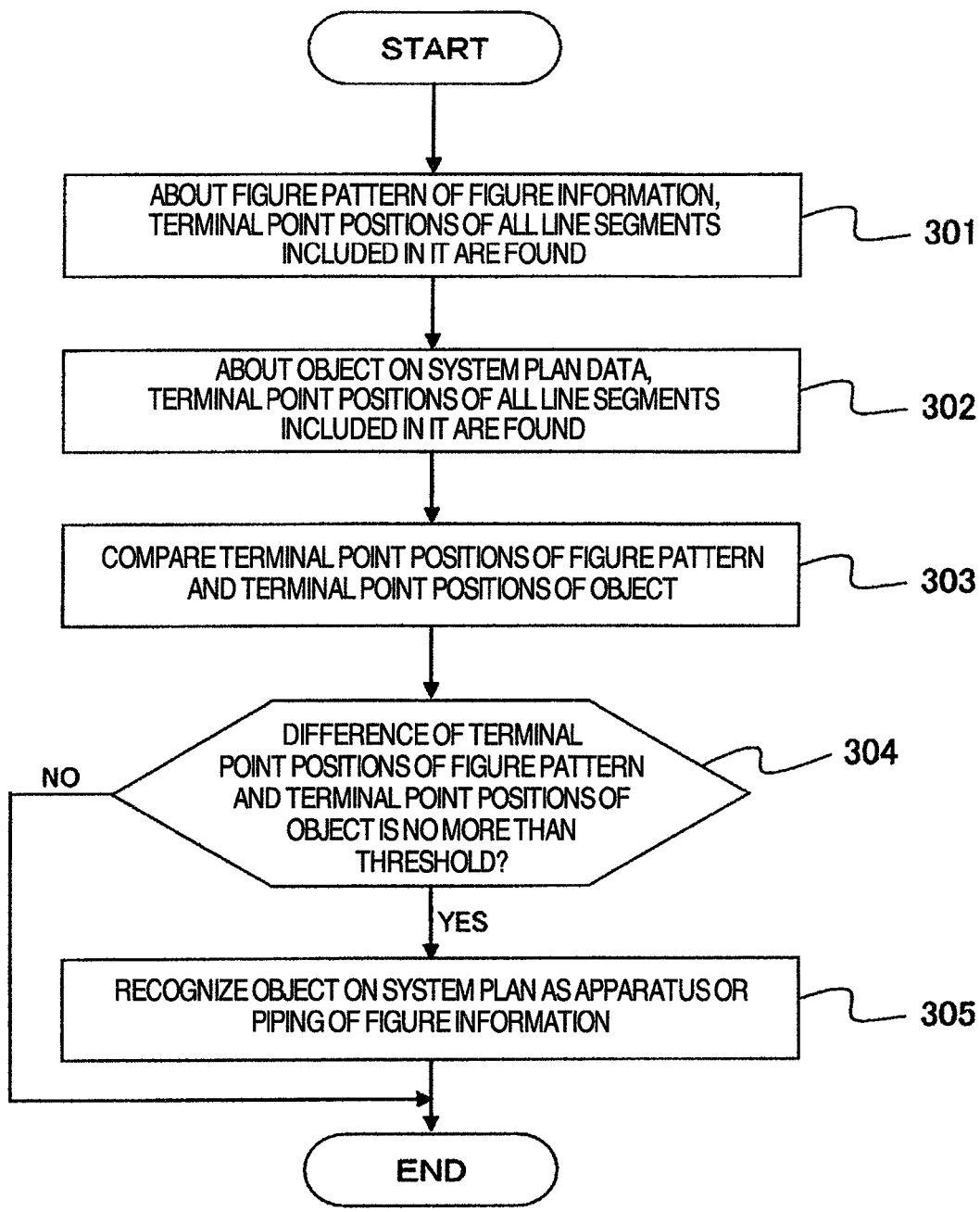
FIG. 15 is a diagram showing a flow of object recognition processing according to the pattern matching method.

The step 201 to step 206 are the plan recognition processing about the apparatus. At the step 201, the figure information of the apparatus, more specifically a figure pattern stored in the figure data of the figure information of the apparatus, and the form of the object on the system plan data D1 are compared, and the object of which form matches the figure information (the figure pattern) of the apparatus is searched and recognized (apparatus object recognition processing by form comparison). This apparatus object recognition processing by form comparison is the processing according to the pattern matching method. The pattern matching method is a method which grasps the figure pattern in the figure information at the terminal points of the line segment included in it, and recognizes the object on the system plan data D1 based on the relative position relationship of its terminal points, and it includes each processing of step 301 to step 305 as shown in FIG. 15.

Figure 16A:
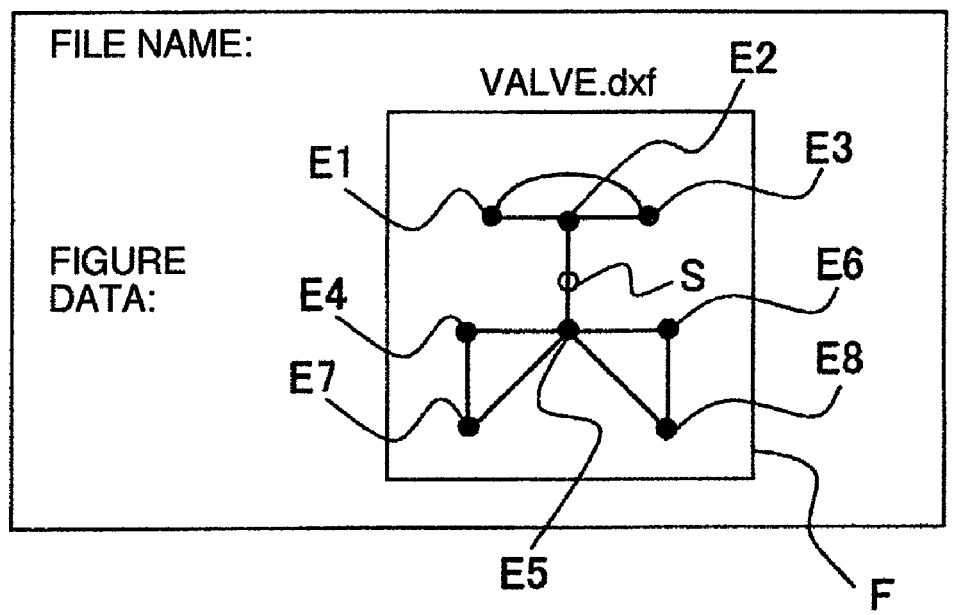
FIGS. 16A and 16B are diagrams explaining terminal point position obtaining processing in the pattern matching method.

At the step 301, about the figure pattern of the figure information, the terminal point positions of all of the line segments included in it are found (terminal point position obtaining processing of the figure pattern). At the terminal point position obtaining processing of the figure pattern, as shown in FIG. 16A as an example of the figure pattern of the figure information D5-a of FIG. 6, a center point of frame F in the figure pattern, that is a figure center point S, is found, and the positions of each of terminal points E1 to E8 of each line segment is found as relative positions to its figure center point S. This corresponds to find coordinates values of each of the terminal points E1 to E8 on the coordinates with the figure center point S as the origin.

Figure 16B:
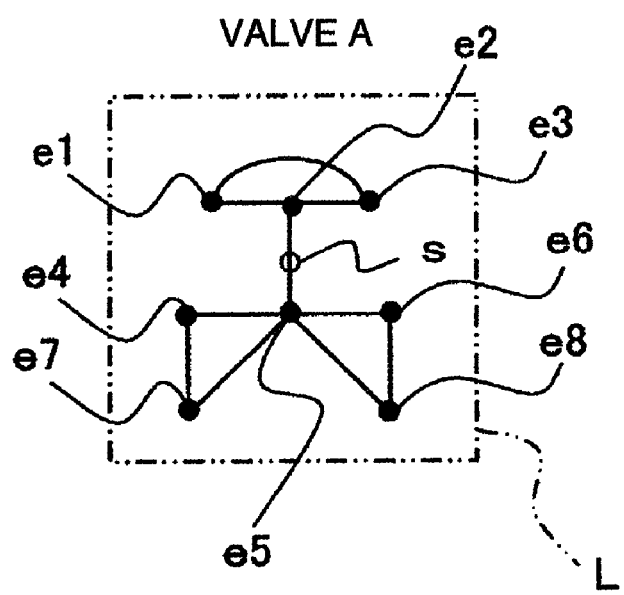

At the step 302, about the object on the system plan data, the terminal point positions of all of the line segments included in it are found (terminal point position obtaining processing of the object). At the terminal point position obtaining processing of the object, as shown in FIG. 16B as an example about the valve A in the system plan data D1 of FIG. 2, a center point of outline L in the object (the valve A), that is an object center point s, is found, and the positions of each of terminal points e1 to e8 of each line segment is found as relative positions to its object center point s. This corresponds to find coordinates values of each of the terminal points e1 to e8 on the coordinates with the object center point s as the origin.

At step 303, the terminal points E1 to E8 in the figure pattern and the terminal points e1 to e8 in the object are compared regarding each position (terminal point position comparison processing). In the terminal point position comparison processing, the difference of the positions of the terminal points E1 to E8 and the positions of the terminal points e1 to e8 is taken. Here, the terminal point position comparison processing is conducted in the condition in which the sizes of the frame F and the outline L are adjusted.

At step 304, it is determined whether the difference of the terminal point positions found at the step 303 is no more than the predetermined threshold or not (determination processing of the terminal point position difference), and if its determination result is positive, said object is recognized as an apparatus (a valve, a piping terminal, a tank, etc.) or piping (linear piping, double piping, vent piping, etc.) of the figure information (recognition processing of the object) at the step 305.

Regarding the object recognition processing according to the pattern matching method as the above, processing to correspond to the cases such as when the apparatus is described sideways in the system plan data and when it is described on its side can be added. More specifically, it is supposed to find the relative position of each terminal point to the center point with the figure pattern in the figure information is tilted with a certain angle, and to also use this tilted condition terminal point position in the terminal point position comparison processing.

Also, previous to the terminal point position comparison processing, it can be arranged to conduct simple form recognition by the comparison of terminal point number. Namely, the object which has the different terminal point number is supposed to be neither apparatus nor piping of the figure information, and only the object which has the same terminal point number is supposed to be the object of the terminal point position comparison processing. Thereby the processing efficiency can be enhanced.

Returning to FIG. 13, at the step 202, the result of the object recognition processing of the step 201 is determined. More specifically, it is determined whether there is an object which matches the figure pattern in the figure information of the apparatus or not (existence determination processing of apparatus figure information matching object).

At the step 203, when it is determined that there is a matching object at the step 202, the plan recognition processing part 11 assigns an apparatus ID to said matching object, that is said matching apparatus, and writes the same in the apparatus unit recognition information of said apparatus (apparatus ID giving processing).

At the step 204, the apparatus kind of the matching apparatus is written in the apparatus unit recognition information of said apparatus (apparatus kind obtaining processing). The apparatus kind is obtained from the data described in the "file name" of the apparatus figure information of the matching origin.

At step 205, the apparatus name of the matching apparatus is written in the apparatus unit recognition information of said apparatus (apparatus name obtaining processing). In the apparatus name, as described above, the individual apparatus name which is given to said apparatus on the system plan data D1 (in the example of FIG. 2, "valve A", "tank T", "piping terminal H", etc.) can be used.

The processing of the step 201 to step 205 mentioned above is conducted about all of the objects on the system plan data D1. For this reason, it is determined whether the processing has been conducted about all of the objects on the system plan data D1 or not as step 206.

Step 207 to step 212 are the plan recognition processing about the piping, and they are the same as the step 201 to step 206 except that the objective object is the piping.

Step 213 to step 215 are the plan recognition processing about the connection relationship of the apparatus and the piping. At the step 213, the connection relationship about each apparatus and each piping recognized until the step 215 is obtained (connection relationship obtaining processing).

At the step 214, a connected piping ID is written in the apparatus unit recognition information based on the connection relationship obtained at the step 213 (connected piping information obtaining processing). More specifically, the connected piping is recognized about each individual apparatus based on the connection relationship obtained at the step 213, thereby the ID of the piping of the connection destination recognized is written in the apparatus unit recognition information as a connected piping ID.

At the step 215, a connected apparatus ID is written in the piping unit recognition information based on the connection relationship obtained at the step 213 (connected apparatus information obtaining processing). More specifically, the connected apparatus is recognized about each individual piping based on the connection relationship obtained at the step 213, thereby the ID of the apparatus of the connection destination recognized is written in the piping unit recognition information as a connected apparatus ID.

Step 216 to step 220 are the plan recognition processing about the piping group based on the connection relationship of the apparatus and the piping. At the step 216, the piping group is recognized based on the connection relationship obtained at the step 213 (piping group recognition processing). The piping group is what a group of piping surrounded by the apparatus is grouped as described above. In the system plan data D1 of FIG. 2, it is recognized that the piping b, the piping c, and the piping d are surrounded by the valve A, the valve B, the valve C, and the valve D based on the connection relationship, and this group of piping is recognized as one piping group.

At the step 217, the plan recognition processing part 11 assigns a piping group ID to the piping group recognized at the step 216 and writes the same in the piping group unit recognition information of said piping group (piping group ID giving processing).

At the step 218, the piping group name of the piping group recognized at the step 216 is written in the piping group unit recognition information of said piping group (piping group name obtaining processing). For the piping group name, the individual piping group name given to said piping group on the system plan data D1 (in the example of FIG. 2, "piping group G") can be used as described above.

At the step 219, the piping ID of the piping which is a member of the piping group recognized at the step 216 is written in the piping group unit recognition information of said piping group (member piping ID obtaining processing).

The above processing of the step 213 to step 219 is conducted about all of the objects on the system plan data D1. For this reason, it is determined whether the processing has been conducted about all of the objects on the system plan data D1 or not as step 220.

The plan recognition data generated as described above can be edited using the plan recognition data editing processing part 14. The editing of the plan recognition data is conducted mainly aiming to complement the mistaken recognition at the plan recognition processing, and it is proceeded with through the operation screen for plan recognition data editing (an apparatus editing screen and a piping editing screen) which the plan recognition data editing processing part 14 displays on the display of the input/output device 5.

Figure 17:
FIG. 17 is a diagram showing an example of an apparatus list display screen which is an apparatus editing screen.

FIG. 17 shows an apparatus list display screen 21 as an example of the apparatus editing screen. On the apparatus list display screen 21, the apparatus ID and the apparatus kind recorded in the apparatus unit recognition information of the apparatus recognized at the plan recognition processing are displayed in a list. The editing of the plan recognition data by the apparatus list display screen 21, more specifically the editing of the apparatus recognition information, includes an apparatus unit editing which individually edits the contents of the apparatus unit recognition information, a collective deletion editing which collectively deletes the apparatus unit recognition information, and an additional editing which adds the apparatus unit recognition information, and the like.

In order to conduct the apparatus unit editing, the user selects an apparatus which the user wants to edit from the apparatus list display screen 21 and depresses an edit button 22. Then an individual editing screen 23 of the apparatus unit recognition information about that apparatus is displayed and the user proceeds with the apparatus unit editing through this individual editing screen 23. In the example of the figure, the apparatus ID and the apparatus kind are supposed to be able to be edited.

In the collective deletion editing, the user selects an apparatus which the user wants to delete from the list display of the apparatus list display screen 21 and depresses a delete button 24. In the additional editing, it is checked whether any apparatus of which apparatus unit recognition information has not been generated is on the system plan data D1 or not by matching the apparatus displayed in a list in the apparatus list display screen 21 with the apparatus on the system plan data D1. Then if there is an apparatus of which apparatus unit recognition information has not been generated is on the system plan data D1, the apparatus unit recognition information about that apparatus is generated.

Figure 18:
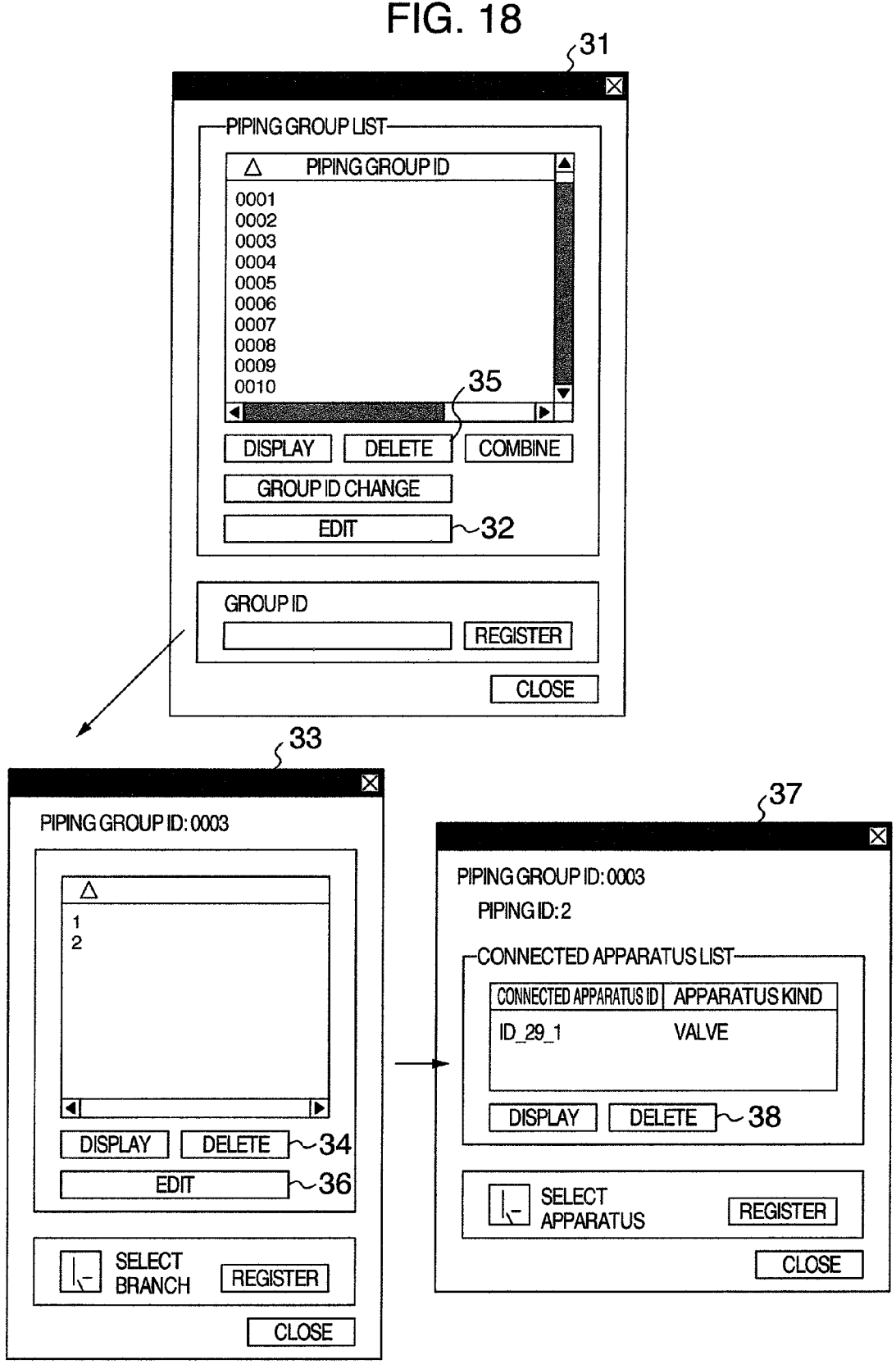
FIG. 18 is a diagram showing an example of a piping group list display screen which is a piping editing screen.

FIG. 18 shows a piping group list display screen 31 as an example of the piping editing screen. In the piping group list display screen 31, the piping group IDs recorded in the piping group unit recognition information of the piping group recognized at the plan recognition processing are displayed in a list. The editing of the plan recognition data by the piping group list display screen 31, more specifically the editing of the piping group unit recognition information, includes a piping group unit editing which individually edits the contents of the piping group unit recognition information, a collective deletion editing which collectively deletes the piping group unit recognition information, and a connected apparatus editing which is conducted about the connected apparatus of the piping, and the like.

In order to conduct the piping group unit editing, the user selects a piping group which the user wants to edit from the piping group list display screen 31 and depresses an edit button 32. Then a member piping list screen 33 which is an individual editing screen of the piping group unit recognition information about that piping group is displayed, and the user proceeds with the piping group unit editing through this member piping list screen 33. In the member piping list screen 33, the member piping IDs in the piping group unit recognition information of the selected piping group are displayed in a list. As piping group unit editing, for example, in the case when the user conducts the deletion or the addition of the member piping, the user checks whether there is or not piping which is omitted from the member or is supposed to be a member while it is not a member by matching the member piping of the member piping ID displayed in a list on the member piping list screen 33 with the piping on the system plan data D1, and if there is a member piping to be deleted, selects the member piping ID of that member piping and depresses a delete button 34, and if there is piping which the user wants to add as a member, the user adds the piping ID of that piping as a member piping ID.

In the collective deletion editing, the user selects a piping group which the user wants to delete from the list display of the piping group list display screen 31 and depresses a delete button 35.

In the connected apparatus editing, the user selects a member piping ID of the piping which the user wants to edit from the list display of the member piping list screen 33 and depresses an edit button 36. Then, a connected apparatus list screen 37 is displayed. In the connected apparatus list screen 37, the connected apparatus IDs of the apparatus connected to the selected piping are displayed in a list. As connected apparatus editing, for example, in the case when the user conducts the deletion or the addition of the connected apparatus, the user checks whether there is or not an apparatus which is omitted from the connected apparatus or is supposed to be a connected apparatus while it is not a connected apparatus by matching the apparatus of the connected apparatus ID displayed in a list on the connected apparatus list screen 37 with the apparatus on the system plan data D1, and if there is a connected apparatus to be deleted, selects the connected apparatus ID of that apparatus and depresses a delete button 38, and if there is an apparatus which the user wants to add as a connected apparatus, the user adds the piping ID of that apparatus as a connected apparatus ID.

By conducting the editing of the plan recognition data as described above, the precision of the plan recognition data can be improved and the sequence design support by the automatic generation of the valve pattern plan can be conducted more efficiently.

Returning to FIG. 5, at the time chart sheet generation processing of the step 102, the time chart generation processing part 15 generates the time chart sheet D2. The generation of the time chart sheet D2 is conducted by that the user defines the condition of the apparatus in the form for the time chart sheet which the time chart generation processing part 15 automatically generates using the plan recognition data D4. More specifically, the time chart sheet form has a table form in which the apparatus name in the plan recognition data D4 is arranged in the vertical axis, namely a "line", and the time step is arranged in the horizontal axis, namely a "column", as seen in the time chart sheet D2 of FIG. 3. In the example of FIG. 3, each apparatus name of valve A, valve B, valve C, valve D, valve E, valve F, piping terminal H, and tank T is displayed on the apparatus name axis, also a step number is given to each time step of the time step axis. Here, the time chart sheet D2 of FIG. 3 is a "time chart sheet" with its lower side from the shaded line is effective, and its upper side from the shaded line records the relative information which is referred to in the sequence design.

The user defines the condition of the apparatus in the time chart sheet form like this. More specifically, the time chart sheet form has the definition section in which the apparatus name axis of each apparatus and the time step axis of each time step cross, and for example, in order to define the apparatus condition of the tank T about the time step with the step number "4", the user defines the apparatus condition of the tank T (in the example of the figure, "open") in a definition section 41 in which the apparatus name axis of the tank T and the time step axis of the step number "4" cross.

The apparatus conditions which can be defined differ depending on the apparatus kind. In the case of the valve and the tank, "open" and "shut" can be designated. The "open" means the condition in which the valve or the tank is open, and the "shut" means the condition in which the valve or the tank is shut. With the apparatus which has the conditions of "open" and "shut" like these, there is a condition in which the "open" and the "shut" are repeated intermittently in one time step, and the condition like this is supposed to be designated as "intermittent".

In the case of the piping terminal, "entrance" and "exit" can be designated. The "entrance" means that the piping terminal is the entrance of the fluid (the ingredient and the product or the wash liquid, etc.). The "exit" means that it is the exit of the fluid.

In the time chart sheet D2 of FIG. 3, "valve A" is designated to be "open", "valve B" to be "shut", "valve C" to be "open", "valve D" to be "shut", "valve E" to be "open", "valve F" to be "shut", "piping terminal" to be "entrance", and "tank" to be "open".

Returning to FIG. 5, in the valve pattern plan generation processing of the step 103, the valve pattern plan generation processing part 16 generates the valve pattern plan D3 using the time chart sheet D2 and the plan recognition data D4, that is the plan recognition information added system plan data. The valve pattern plan D3 is plan data which describes the flow path condition per time step of the fluid such as the ingredient and the product or the wash liquid and the like in the apparatus and piping system as described above. Therefore, the generation of the valve pattern plan D3 by the valve pattern plan generation processing part 16 proceeds such that first it searches the piping terminal of which condition is "entrance", then it searches in order the piping connected to the piping terminal of the condition "entrance", the apparatus connected to that piping about the plan recognition data D4, further determines the piping in which the fluid flows by determining the condition of the searched apparatus, generates the valve pattern plan as an apparatus and piping system plan which expresses the flow path condition easily to see by emphasizing these piping by changing the figure display, etc.

The valve pattern plan D3 like this is generated per time step in the time chart sheet D2, and by designating the time step on the time chart sheet D2 it can be displayed about said time step on the display of the input/output device 5. Here, the valve pattern plan D3 of FIG. 4 is a valve pattern plan of the time step of the step number "4" in the time chart sheet D2 of FIG. 3.

Figure 19:
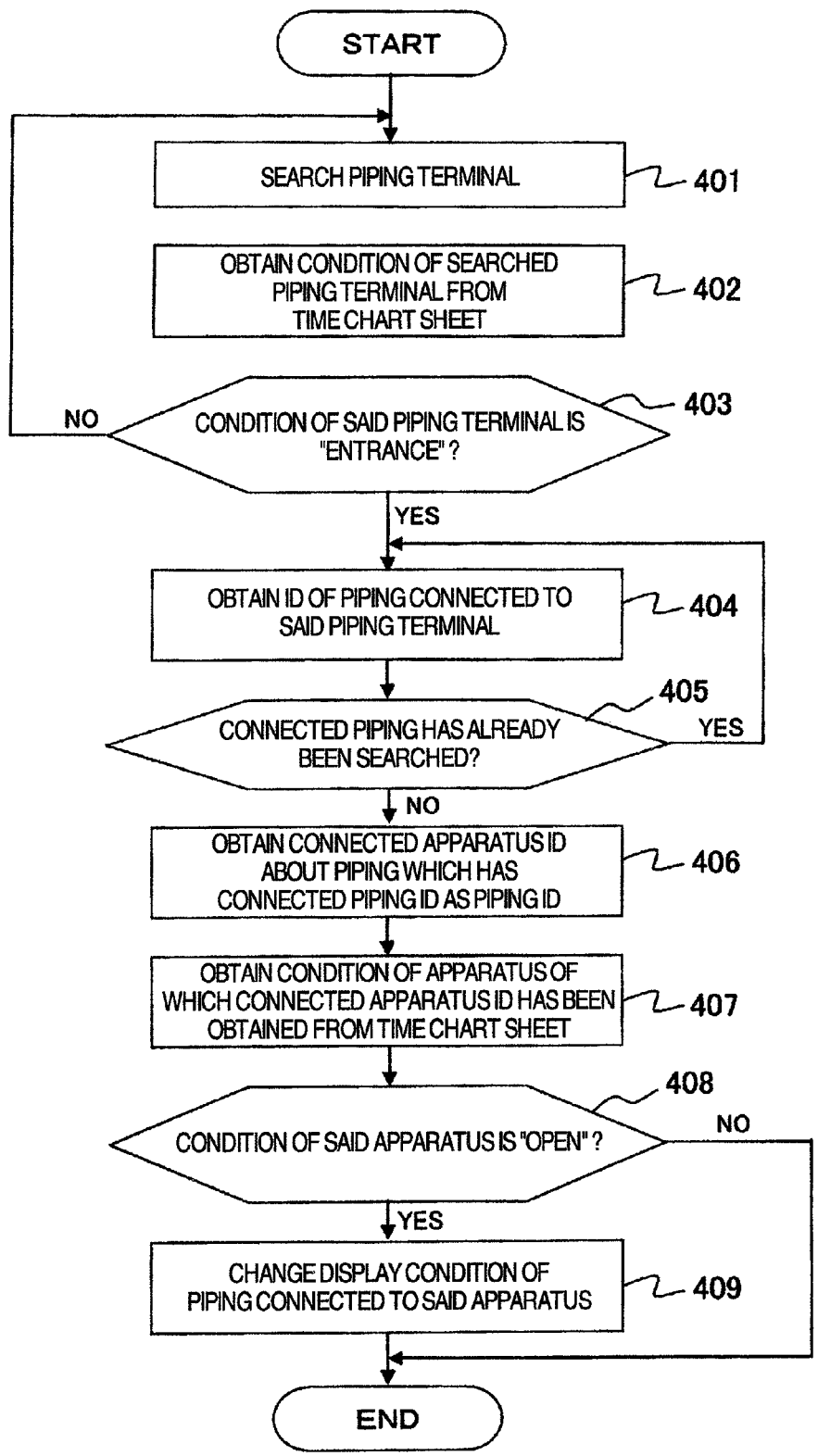
FIG. 19 is a diagram showing a flow of basic processing in valve pattern plan generation processing.

FIG. 19 shows the flow about the basic processing in the valve pattern plan generation processing. As seen in the figure, the basic processing in the valve pattern plan generation processing includes each processing of step 401 to 409. At the step 401, the piping terminal is searched (piping terminal searching processing). In the piping terminal searching processing, the piping terminal is searched based on the apparatus recognition information in the plan recognition data D4. In the case of the system plan data D1 of FIG. 2, for example, the piping terminal H is searched. It will be explained below assuming that the searched is the piping terminal H.

At the step 402, the condition of the searched piping terminal H is obtained from the time chart sheet (piping terminal condition obtaining processing), and it is determined whether the condition of the piping terminal H is "entrance" or not at the step 403 (piping terminal condition determination processing). In the example of the time chart sheet D2 of FIG. 3, as the piping terminal H is "entrance", the result of the step 403 becomes positive.

If the determination result is positive at the step 403, the process proceeds to the step 404 and the ID of the piping connected to the piping terminal H is obtained (connected piping ID obtaining processing). In the connected piping ID obtaining processing, the connected piping ID is obtained from the apparatus unit recognition information of the piping terminal H. In the case of the system plan data D1 of FIG. 2, as the piping a is connected to the piping terminal H, the ID of the piping a is obtained as a connected piping ID.

At the step 405, it is determined whether the piping a has already been searched or not (already searched determination processing). If it is determined that the piping a has not been searched yet at the step 405, the process proceeds to the step 406 and the connected apparatus ID is obtained from the piping unit recognition information of the piping a (piping connected apparatus ID obtaining processing). The piping connected apparatus ID obtaining processing is, generally speaking, processing which obtains the connected apparatus ID from the piping unit recognition information of said piping about the piping which has the connected piping ID as a piping ID.

At the step 407, the condition of the apparatus of which connected apparatus ID was obtained at the step 406 is obtained from the time chart sheet D2 (apparatus condition obtaining processing). More specifically, as the piping ID of the valve A is obtained as a connected apparatus ID at the step 406, the condition "open" of that valve A is supposed to be obtained from the time chart sheet D2.

At the step 408, it is determined whether the condition of the apparatus obtained at the step 407 is "open" or not (apparatus condition determination processing). In the case of the valve A, as it is "open", the result of the apparatus condition determination processing becomes positive and the process proceeds to the step 409.

At the step 409, the display condition of the piping connected to the apparatus which has been determined to be "open" at the step 408 is changed (piping display condition change processing). More specifically, the piping or the member piping of the piping group connected to the apparatus which has been determined to be "open" is searched from the apparatus unit recognition information, and the figure display condition of that piping or that member piping of the piping group is changed. In the example of FIG. 4, the piping a connected to the valve A has been changed in its display condition by making it thick line.

The valve pattern plan generation processing is proceeded with the above basic processing as a framework, and it will go like below specifically explaining it as an example according to the system plan data D1 of FIG. 2 and the time chart sheet D2 of FIG. 3.

First, the piping terminal H is searched. As the piping terminal H is set to be "entrance" in the time chart sheet, the search hereinafter is started at this. Then, the piping a connected to the piping terminal H is searched, and further, the valve A connected to the piping a is searched. As the valve A is set to be "open" on the time chart, the display thickness of the piping a is changed.

Following this, the search is conducted about each of the piping b, the piping c, and the piping d connected to the valve A. First, the search is conducted about the piping b, and further the valve B connected to the piping b is searched. As the valve B is set to be "shut" on the time chart, the change of the display thickness of the piping is not conducted and the search is terminated at the valve B. Next, the search is conducted about the piping c, and further the valve C connected to the piping c is searched. As the valve C is set to be "open" on the time chart, the display thicknesses of the piping c and the piping b and the piping d which are the member piping of the piping group of which the piping c is the member piping are changed. Or the search of the piping f connected to the valve C is conducted, and further the tank T connected to the piping f is searched. As the tank T is set to be "open" on the time chart, the display thickness of the piping f is changed. Following this, the search of the piping g connected to the tank T is conducted and the display thickness of the piping g is changed. Thereafter, the search will be continued in the same way.

Next, the search is conducted about the piping d, and further the valve D connected to the piping d is searched. As the valve D is set to be "shut" on the time chart, the change of the display thickness of the piping is not conducted and the search is terminated at the valve D.

It has been explained about one embodiment to implement the present invention above, but this embodiment is only a representative example, and the present invention can be implemented in various forms without deviating from the scope of its intention.

The invention claimed is:

1. A sequence design support system which supports a sequence design as a design of a sequence control program which controls a flow path condition of a fluid in an apparatus and piping system which is constructed connecting apparatus such as valve with piping, which comprises a valve pattern plan generation unit which generates a valve pattern plan which is plan data which shows the flow path condition per time step of said fluid in said apparatus and piping system from apparatus and piping system plan data which is plan data showing said apparatus and piping system and a time chart sheet which is obtained defining a condition of said apparatus in said apparatus and piping system per time step.

2. A sequence design support system of claim 1, wherein said valve pattern plan generation unit comprises a plan recognition processing part and a valve pattern plan generation processing part, said plan recognition processing part individually recognizes apparatus and piping or piping group and the like on said apparatus and piping system plan data, at the same time generates plan recognition data conducting plan recognition processing which is processing which recognizes connection relationship of individually recognized apparatus and the like and relationship of member piping of piping group and the like, and said valve pattern plan generation processing part generates said valve pattern plan using said plan recognition data.

3. A sequence design support system of claim 2, wherein said valve pattern plan generation unit further comprises a figure information database which stores figure information which is information about figure expression of said apparatus and piping and the like on said apparatus and piping system plan data and provides the same to said plan recognition processing part, said plan recognition processing part conducts said plan recognition processing based on said figure information.

4. A sequence design support system of claim 3, wherein said valve pattern plan generation unit further comprises a time chart generation processing part, said time chart generation processing part generates a time chart sheet form used to generate said time chart sheet from said plan recognition data.

5. A sequence design support system of claim 2, wherein said valve pattern plan generation unit further comprises a time chart generation processing part, said time chart generation processing part generates a time chart sheet form used to generate said time chart sheet from said plan recognition data.

6. A sequence design support system of claim 4, wherein the generation of said valve pattern plan in said valve pattern plan generation processing part is conducted including the processing such as first searching a piping terminal of which condition is "entrance", then searching in order the piping connected to the piping terminal of the condition "entrance", and the apparatus connected to said piping based on said plan recognition data, further determining the flow path condition of the fluid in said apparatus and piping system by determining the condition of the searched apparatus by said time char sheet.

7. A sequence design support system of claim 2, wherein the generation of said valve pattern plan in said valve pattern plan generation processing part is conducted including the processing such as first searching a piping terminal of which condition is "entrance", then searching in order the piping connected to the piping terminal of the condition "entrance", and the apparatus connected to said piping based on said plan recognition data, further determining the flow path condition of the fluid in said apparatus and piping system by determining the condition of the searched apparatus by said time char sheet.

8. A sequence design support system of claim 6, wherein said valve pattern plan is generated in a form which displays the flow path condition of the fluid in said apparatus and piping system by the change of display condition of said piping on said apparatus and piping system data.

9. A sequence design support system of claim 1, wherein said valve pattern plan is generated in a form which displays the flow path condition of the fluid in said apparatus and piping system by the change of display condition of said piping on said apparatus and piping system data.

10. A sequence design support system of claim 8, wherein said valve pattern plan generation unit further comprises a plan recognition data editing processing part to conduct the editing of said plan recognition data.

11. A sequence design support system of claim 2, wherein said valve pattern plan generation unit further comprises a plan recognition data editing processing part to conduct the editing of said plan recognition data.

12. A sequence design support system of claim 10, wherein said time chart sheet has a table form which has a line which arranges each apparatus on said apparatus and piping system plan data, a column which arranges said time step, and a definition section in which said line and said column cross, and the condition of said apparatus is defined in said definition section.

13. A sequence design support system of claim 1, wherein said time chart sheet has a table form which has a line which arranges each apparatus on said apparatus and piping system plan data, a column which arranges said time step, and a definition section in which said line and said column cross, and the condition of said apparatus is defined in said definition section.

* * * * *